A. H. DE VOE.
BUTTON FASTENING MACHINE.
APPLICATION FILED MAY 16, 1913.

1,157,621.

Patented Oct. 19, 1915.
5 SHEETS—SHEET 2.

WITNESSES:

INVENTOR
Albert H. DeVoe
BY
Henry J. Miller
ATTORNEY

A. H. DE VOE.
BUTTON FASTENING MACHINE.
APPLICATION FILED MAY 16, 1913.

1,157,621.

Patented Oct. 19, 1915.
5 SHEETS—SHEET 3.

WITNESSES:
Géza L. Terna
W. P. Stewart

INVENTOR
Albert H. de Voe
BY
Henry J. Miller
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

BUTTON-FASTENING MACHINE.

1,157,621.           Specification of Letters Patent.           Patented Oct. 19, 1915.

Application filed May 16, 1913. Serial No. 767,963.

*To all whom it may concern:*

Be it known that I, ALBERT H. DE VOE, a citizen of the United States, residing at Westfield, in the county of Union and State of New Jersey, have invented certain new and useful Improvements in Button-Fastening Machines, of which the following is a specification, reference being had therein to the accompanying drawings.

This invention has for its primary object to provide a sewing machine capable of producing series of groups of tacking stitches each adapted to be spaced at different intervals from those preceding and succeeding it and to which it is connected by lines of straight-away stitching; the form of composite seam thus produced being adapted more especially for stitching on that class of metallic fasteners or buttons commonly attached to one of the overlapping heel-flaps of a cloth shoe-upper or "tabi" for introduction within a cord-loop secured upon the other flap, such as that for which the mechanism forming the subject of my pending application Serial No. 718,807, filed September 6, 1912, is designed to produce.

It has for another object to feed the fasteners or buttons to the stitch-forming mechanism at the required frequency and to insure the positive movement thereof under the stitching operation.

It also has for its object to provide such a machine with accessories for facilitating the attachment of the fasteners or buttons to the tabi-flap.

In its preferred form, the improvement comprises stitch-forming mechanism including a reciprocating and laterally moving needle and feeding mechanism with controlling means whereby the feeding mechanism is adapted to impart to the work interrupted series of uniform feeding or work-advancing movements, the feeding movements of each series differing in number and in length from those of the adjacent series, while lateral jogging movements within the direction of feed are imparted to the needle in the periods of inaction of the feeding mechanism. In conjunction with such stitch-producing mechanism, button-presenting means are employed which preferably consists of a race-way adapted to guide the buttons from beneath a magazine or hopper in a substantially fixed path to the stitch-forming mechanism, the buttons being propelled from the hopper by a reciprocatory plural-armed button-feeding member with each of its arms adapted to yield transversely of the race-way and provided with a button-engaging shoulder and with the primary arm being formed with an extension lying beneath the hopper and adapted to sustain the lowermost button while the propelling portion of said arm is performing its function. Coöperating with the propelling arms of said feeder are series of oppositely yielding button-detainers normally lying in the path of the buttons in their movement to the stitching mechanism and adapted to prevent their retrograde movement in the return of the feeder arms after a button-propelling action, but to yield to allow the buttons to pass over them in their advance movement. The machine as thus constructed is designed to secure upon the folded margin of a body fabric and the superposed margin of an oppositely extending lining fabric the transversely perforated end portions of the metallic buttons or tabi-fasteners before mentioned. The fasteners are secured to the fabric by spaced groups of tacking stitches extending over their opposite edges and into the adjacent apertures which are connected by a few straight-away fastening stitches, the tacking stitches between the fasteners being connected by series of straight-away stitches exceeding in number that of the straight-away fastening stitches and adapted to be increased or decreased in length to vary the spacing apart of the fasteners or buttons. Means are also provided for adjustment of the primary stitch length in addition to that for changing the relative lengths of the fastening and the spacing straight-away stitches.

The invention further includes various details of construction of the mechanism as thus briefly described, and certain accessories, including special features of the feed-dog and presser-foot, for insuring the proper presentation of the buttons and advance of the work to space the stitches.

In the accompanying drawings.

4 a bottom plan of the same. Fig. 7 is a perspective view of a portion of the counting device for the controlling means of the stitch-forming and feeding mechanisms, and Fig. 8 an elevation, partly in section, of a portion thereof. Fig. 9 is a perspective view of the presser-foot taken from the under side. Fig. 10 is a perspective view of the feeding and needle mechanisms, and Fig. 11 a sectional elevation of the needle-bar and parts connected therewith. Fig. 12 is a sectional elevation of the controlling cam and connected parts, and Fig. 13 a perspective view of said cam detached. Fig. 14 is an elevation, in transverse section, of the two-part feed-dog. Fig. 15 is a perspective view of the button-presenting means, Fig. 16 a plan, and Figs. 17, 18 and 19 sectional elevations of portions thereof, upon a larger scale.

As represented in the drawings, the machine comprises a frame constructed with the bed-plate 1 and bracket-arm composed of the hollow standard 2 and overhanging tubular arm 3 in which latter is journaled the main-shaft 4 carying at its rearward end the balance-wheel 5 and belt-pulley 6. Journaled in the head of the bracket-arm is the tubular needle-bar 7 upon the upper end of which is secured by clamp-screws 8 the split collar 9 carrying the lateral stud 10 which is embraced by the apertured lower end of the pitman 11 whose apertured opposite end embraces the usual crank-pin 12 of the crank-disk 13 fixed upon the main-shaft 4. The stud 10 carries at its extremity the roller 14 confined within the vertical guide-groove 15 of the bracket-arm head to prevent the turning of the needle-bar 7 within its bearings. The needle-bar carries at its lower end the block 16 formed with the transverse slideway 17 in which is fitted the needle-carrying slide-block 18 having the depending boss 19 provided with the usual socket for the shank of the needle 20. The slide-block 18 is formed with a rigid laterally extending arm 21 passing through an aperture in the side of the block 16 and forked to embrace the roller-stud 22 carried by a lateral arm 23 of a collar 24 secured by means of the set-screw 25 upon the lower end of an oscillatory rod 26 journaled within the needle-bar.

The split-collar 9 is formed with an upward extension 9' in which is journaled the lower portion of a rod 27 formed in its lower end with a socket to receive the upper extremity of the rod 26. The split collar is laterally recessed intermediate its portions 9 and 9' to receive the intermediate collar 28 embracing the rod 27 to which it is secured by means of the set-screw 29 passing through the rod 27 and engaging the upper portion of the oscillatory rod 26. The rod 27 is journaled in the upper member of the bracket-arm head which is embraced by the spaced members 30 and 31 of a rocking bracket 32 journaled upon said rod and whose lower member has a radial slit in which is secured by screws 33 the spline 34 entering the longitudinal key-way 35 of the rod 27, whereby the rod is adapted to reciprocate freely within but to rock with the bracket 32. The upper member 31 of the bracket carries a stud 36 which is embraced by a strap 37 at one end of a pitman 38 whose opposite end carries a strap 39 embracing a stud-screw 40 carried by a lateral arm 41 of a rocking yoke 42 which is journaled upon the rock-shaft 43 sustained in bearings of the bracket-arm and provided with a lateral arm 44 carrying the depending roller-stud 45. The rocking of the yoke 42 by means presently to be described, imparts oscillatory movements to the rods 27 and 26 and vibratory movements to the arm 23 by means of which lateral jogging movements are communicated to the needle-clamp block 18 and needle 20.

Figure 1:
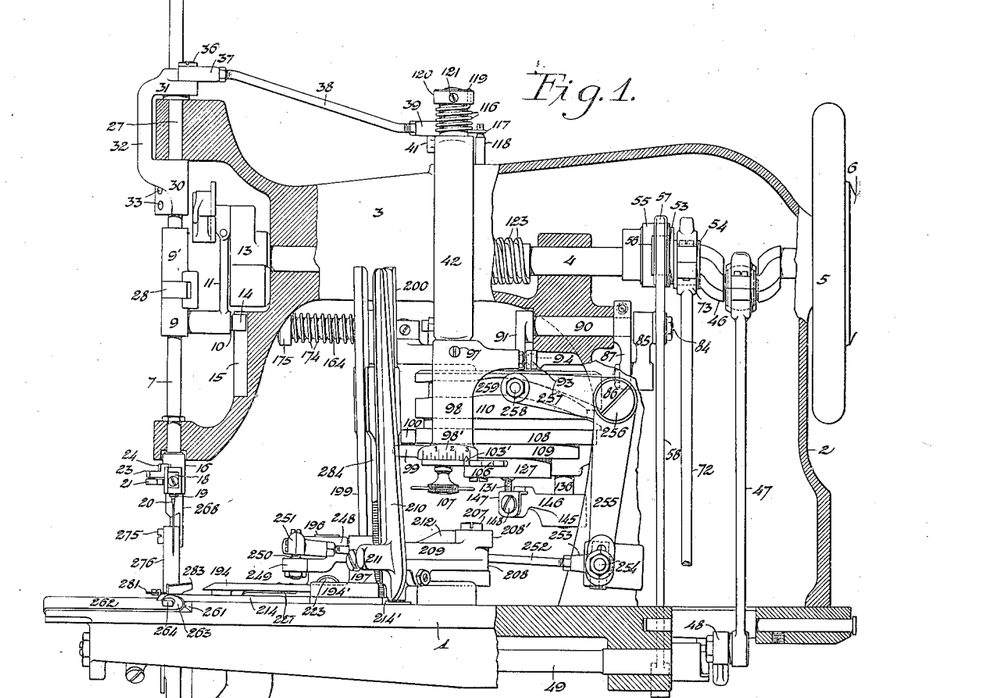
Figure 1 is a front side view, partly in section, of a sewing machine embodying the present improvements, and Fig. 2 a plan of the same with the bracket-arm omitted.

As in the well known Singer oscillating shuttle machine, the main-shaft is formed with a shuttle-actuating crank 46 connected by a pitman 47 and intermediate rocker 48 with a crank upon the rearward end of the shuttle-actuating rock-shaft 49 having upon its opposite end the shuttle-driver 50 for imparting oscillatory movements to a shuttle mounted in the recess 51 and containing the usual thread-case 52 and adapted to coöperate with the needle in the production of stitches. The main-shaft has secured thereon adjacent the shuttle-actuating crank 46 the usual feed-actuating and feed-lift eccentrics 53 and 54. The eccentric 53 (Figs. 1 and 10) is embraced by a strap 55 provided with channeled bearing lugs 56 embraced by the fork 57 at the upper end of the link-bar 58 whose lower end is adjustably connected by means of the bolt 59 passing through the slot 60 with the lateral arm 61 of the feed rock-shaft 62 having the usual bearing lugs 63 carrying center-screws for the cross member 64 of the feed-bar 65 which is formed in its opposite end with the fork 66. The fork 66 is entered by the usual roller-stud 67 carried by the lateral arm 68 of the feed lift rock-shaft 69 having at its rearward end the usual lateral arm 70 to which is pivotally connected by means of the screw-stud 71 the pitman-rod 72 having at its opposite end a strap 73 embracing the feed-lift eccentric 54.

Figures 10, 11, 12, 13, 14:
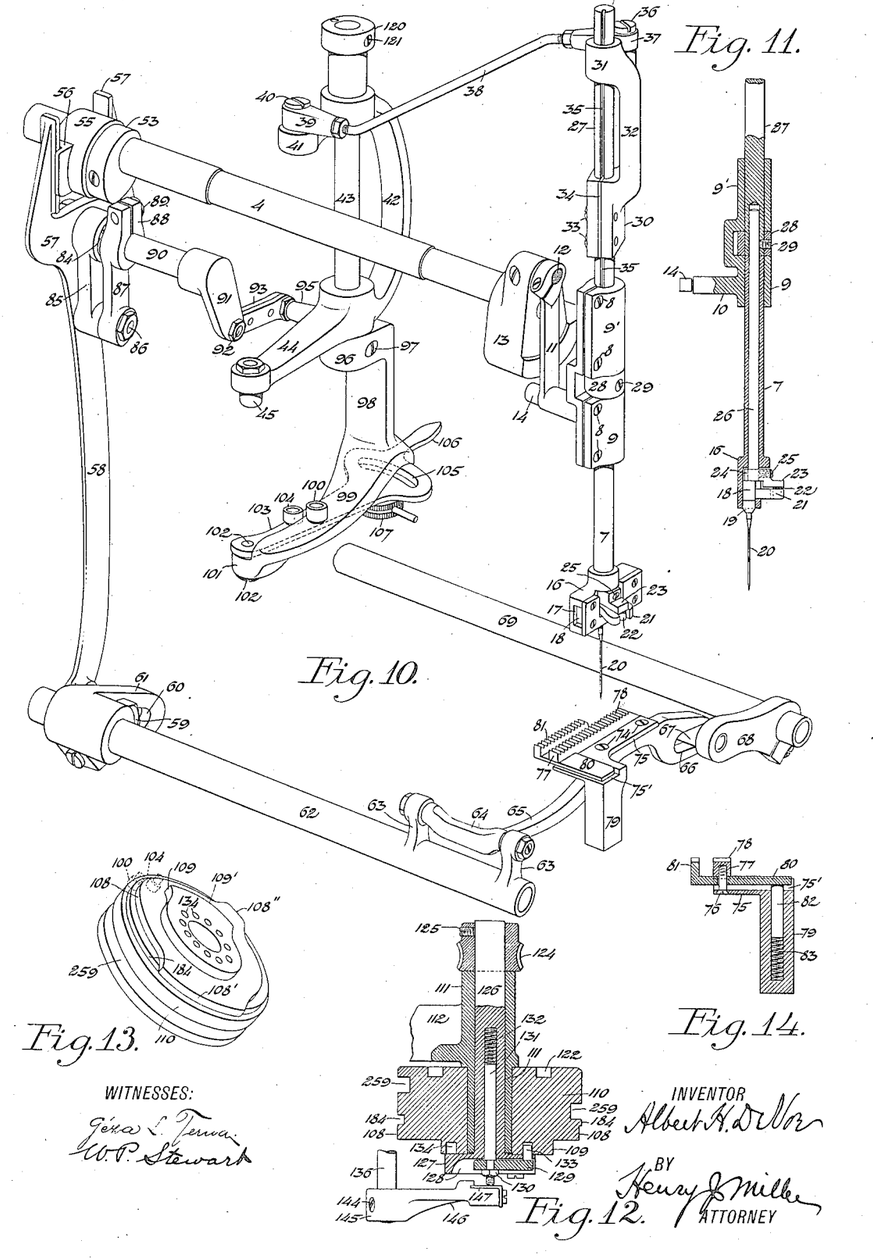

The feed-bar 65 has secured thereon (Figs.

10 and 14) by means of screws 74 the shank 75 of the primary feed-dog section having secured thereon by screws 76 a rectangular block 77 having its upper surface formed with the teeth or serrations 78, the shank 75 being formed with the depending and laterally offset socket member 79. The shank member 75 is shown provided at one end with a transverse channel 75' extending across the top of the socket member 79 in which is fitted the shank 80 of the auxiliary feed-dog section 81 provided with the usual serrated feeding surface, the shank 80 having rigidly attached thereto the depending stud-pin 82 extended within the bore of the socket member 79 and normally pressed upwardly by means of the spring 83 to maintain the shank 80 seated within a notch in the bottom of the feed-dog section 77 so as to yieldingly maintain the feeding surface of the section 81 at the level of that of the section 77, as represented in Fig. 10.

Figures 7, 8, 9:
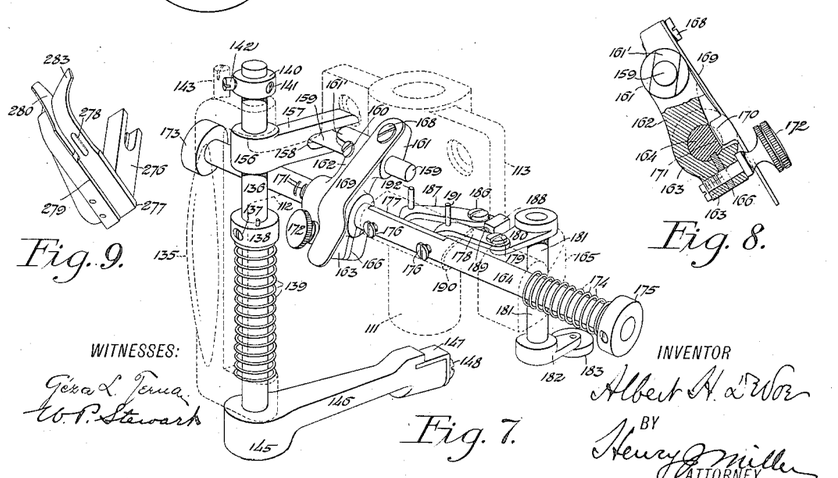

The link-bar 58 carries at its fork 57 the stud-screw 84 embracing the apertured upper end of the link 85 whose lower end embraces the fulcrum-stud 86 carried by the depending arm 87 whose split hub 88 is secured by means of the clamp-screw 89 upon the rock-shaft 90 which is journaled in a suitable bearing provided therefor in the bracket-arm and carries at its opposite end the depending crank-arm 91. The arm 91 carries a stud 92 embraced by one end of the split link 93 whose opposite end embraces a stud 94 carried by a lateral arm 95 of a rocking feed-regulator frame having the hub 96 secured by the set-screws 97 upon the lower end of the rock-shaft 43 and constructed with a depending member 98 from which extends the lateral arm or lever 99 carrying upon its upper face the roller-stud 100. The lever 99 has at its outer extremity the downwardly offset lateral lug 101 in which is mounted the fulcrum-screw 102 of the lever 103 carrying upon its upper face the roller-stud 104 and having near its opposite end an enlargement containing the segmental transverse slot 105 and terminating in the finger-piece 106. The lever 103 is secured adjustably upon the lever 99 by means of the clamp-screw 107 whose shank passes through the slot 105 and is tapped into the lever 99. As represented in the drawings, the roller-studs 100 and 104 are arranged at different levels, and in register with the peripheral cam-tracks 108 and 109 of a cam-cylinder 110 journaled upon the tubular bearing boss 111 (Figs. 7 and 12) of a bracket 112 whose foot 113 is secured by screws 114 to a depending flange 115 of the bracket-arm member 3. The roller-studs 100 and 104 are maintained in operative relation with the cam 110 by means of a spring 116 surrounding the upper portion of the rock-shaft 43 and having one extremity 117 engaged by the fixed stud 118 and the other extremity 119 introduced in an aperture in the collar 120 secured by the set-screws 121 upon the upper end of the rock-shaft 43. The upper end of the cam-cylinder 110 is formed with a cam-groove 122 entered by the roller-stud 45 of the rocking yoke 42 by means of which lateral jogging movements are imparted to the needle.

Secured upon the main-shaft 4 is the worm 123 meshing with the worm-wheel 124 which is secured by means of the set-screw 125 upon the upper end of the cam-wheel shaft 126 journaled within the bore of the tubular hub 111. As shown and described in my said pending application Serial No. 718,807, the shaft 126 has upon its lower end the disk 127 formed in its lower face with the radial channel 128. Fitted to the side walls of the channel 128 is an arm 129 secured by means of the clamp-nut 130 upon the reduced threaded lower end of the plunger-pin 131 which is fitted within an axial socket formed in the shaft 126 and pressed downwardly by means of the spring 132. The arm 129 carries an upwardly extending coupling pin 133 which passes through an aperture in the disk 127 and is adapted to enter any one of a circular series of holes 134 in the lower end of the cam 110 for detachably securing the latter to the constantly rotating shaft 126.

The bracket 112 is provided with an upright member 135 having apertured bearing lugs in which is journaled the endwise movable rock-shaft 136 having secured thereon by means of the set-screw 137 the collar 138 to which is secured one end of a tortion and compression spring 139 whose opposite end is secured in the lower bearing lug. A collar 140 is secured upon the upper end of the rock-shaft 136 by means of set-screws 141 and 142, the projecting head of the latter being adapted for engagement with the stud-screw 143 tapped into the bracket member 135 and serving as a stop to determine the initial axial position of the rock-shaft. Secured to the lower end of the rock-shaft 136 by means of the set-screw 144 is the hub 145 of a laterally extending latch-arm 146 provided in its outer end with a wear-plate 147 secured thereon by the screw 148 and adapted to serve as a rest for the lower extremity of the plunger-pin 131.

Mounted upon the fulcrum screw-stud 149 sustained by the bracket-arm member 3 is the presser-bar lifting rock-lever 150 having upon its rearwardly extending arm the upwardly and laterally offset lug 151 which overhangs the upper end of the rock-shaft 136. The rearward arm of this rock-lever is pivotally connected by means of the screw-pin 152 with the head 153 of a rod 154 passing through the bed-plate and pivotally connected beneath the same with the tilting lever 155 which is adapted in practice to be actuated by means of a knee lever or treadle to tilt the rock-lever 150.

Preparatory to a button stitching operation, the coupling arm 129 is in its lower retracted position with the pin 133 disengaged from the cam-cylinder 110, and one edge of the wear-plate is disposed slightly above the lower end of the plunger-pin 131 and is maintained by the spring 139, resting against the side of said plunger-pin. The lug 151 is normally spaced some distance above the upper end of the rock-shaft 136, and operation of the rock-lever 150 causes the lifting of the presser-foot near the completion of which, engagement of the lug 151 with the end of the rock-shaft 136, causes the lowering of the arm 146 below the end of the plunger-pin 131, thereby permitting the wear-plate 147 under the action of the spring 139, to assume a position beneath the plunger-pin; and the subsequent release of the rock-lever permits the rock-shaft 136 to rise under the action of the spring 139 thereby forcing upwardly the plunger-pin 131 in opposition to its weaker spring 132 and causing the coupling pin 133 to enter the first of the cam-wheel apertures 134 which it thereafter encounters, whereby the cam-wheel is driven positively until the rock-shaft 136 is turned so as to shift the arm 146 and wear-plate 147 laterally to release the plunger-pin 131 and permit the same to descend under the action of the spring 132 to uncouple the cam-cylinder from the continuously rotating shaft 126.

The counting device for timing the uncoupling of the cam-cylinder from its actuating shaft is constructed substantially as shown and described in my said pending application Serial No. 718,807. Secured upon the rock-shaft 136 beneath the upper bearing lug of bracket-arm 135 is the hub 156 of a laterally extending tappet arm 157 formed with a slot or fork 158 in its outer portion to embrace a transverse pin 159 secured by means of the set-screw 160 in the boss 161 at the outer end of an upwardly inclined trip-arm 162 having at its other end a split hub 163 fitted upon the rack-bar 164 which is journaled within a bearing member 165 and the bracket-arm member 135. The hub 163 has secured therein the spline plate 166 whose inner edge enters a key-way of the bar 164, so that, while the arm 162 is adjustable lengthwise of said bar, the latter is turned by the lateral movement of such arm. The boss 161 is formed adjacent the arm 157 with a rounded nose 161' adapted for engagement with said arm, and such boss has secured to its flattened rearward side by means of the screw 168 a flat spring 169 having an inturned lip 170 entering any one of a series of notches 171 formed in the side of the bar 164. By lifting the spring 169, the lip 170 is disengaged from one of the notches of the bar 164, and the loosening of the clamp-screw 172 of the hub 163 permits the arm to be shifted lengthwise of the bar 164 to bring the locking lip 170 of the spring 169 into register with the desired notch 171 in which position the arm 162 is secured by release of said spring.

Figure 3:
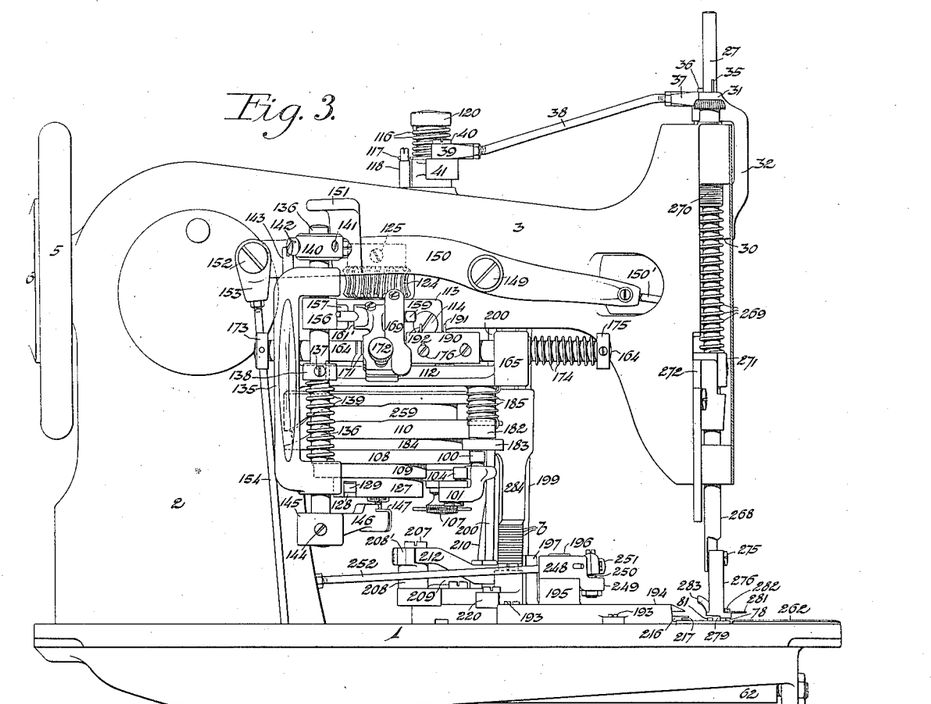
Fig. 3 is a rear side elevation of the machine, and Fig.
Figure 4:
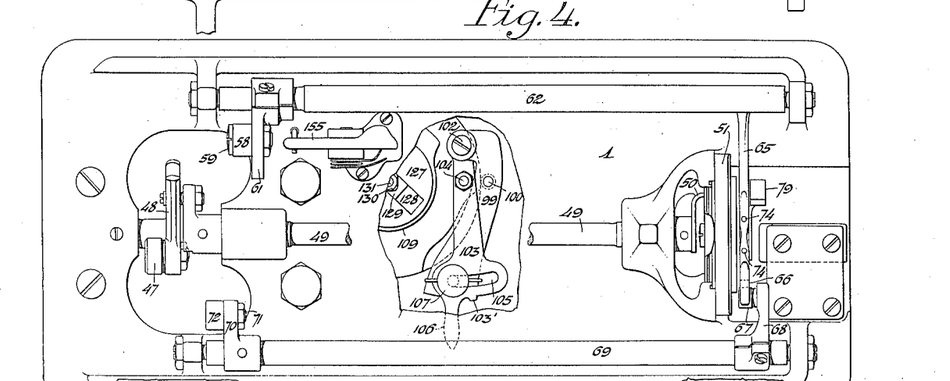
Figure 5:
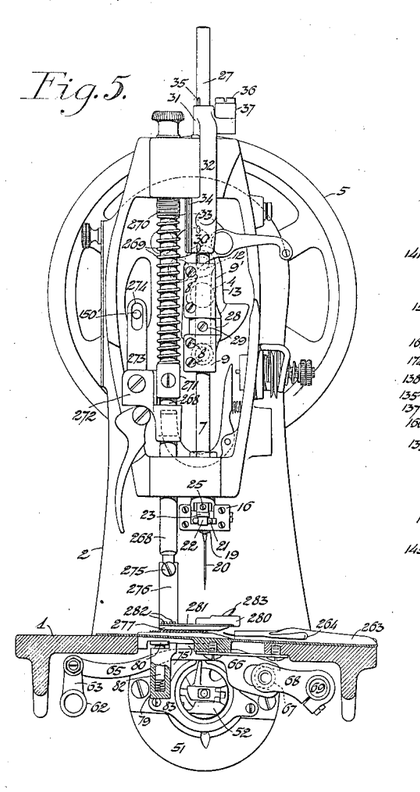
Fig. 5 is a front end view of the machine with the face-plate of the bracket-arm removed and the bed-plate in section, and Fig. 6 a transverse sectional elevation of the machine, looking toward the rear end.

The bar 164 has secured to its rearward end the thrust collar 173 which is normally maintained in contact with the adjacent wall of the bracket-arm member 135 (Fig. 3) by the action of the spring 174 surrounding the bar 164 and interposed between its forward bearing lug 165 and the thrust collar 175 secured to said bar.

The bar 164 has secured in a recess in one side by means of screws 176 a block 177 provided in its outer face with rack teeth adapted for engagement by the actuating pawl 178 mounted upon the stud-screw 179 carried by a lateral crank-arm 180 upon the upper end of a rocking pin 181 whose lower end is similarly provided with an oppositely extending crank-arm 182 carrying a roller-stud 183 maintained in contact with the peripheral cam-track 184 of the cam-cylinder 110 by means of the spring 185 surrounding the bearing boss for the pin 181 depending from the bracket 112 and attached at the opposite ends respectively to the bearing lug 165 and the hub of the arm 182. Tapped into a member of the bracket 112 is the screw-stud 186 affording a fulcrum for the holding pawl 187 also adapted for engagement with the rack-teeth of the block 177 and having an extension 188 provided with a transverse socket between the bottom of which and the adjacent edge of the actuating pawl 178 is interposed a spring 189 by means of which both pawls are normally maintained in operative relation with the bar 164. Secured to the bar 164 by means of the screws 176 is a shield-plate 190 one edge of which overhangs the pawls 178 and 187 and normally lies adjacent the pins 191 and 192 sustained by the latter. The cam-track 184 is so formed that one rocking movement is imparted to the pin 181, and hence one operative movement is given to the actuating pawl 178, for each rotation of the cam-cylinder, the bar 164 thus performing one advance step in opposition to its spring 174 for every rotation of the cam-cylinder. When the bar 164 has advanced sufficiently to cause the operative engagement of the nose 161' of the arm 162 with the tappet-arm 157 of the rock-shaft 136, the latter is rocked and the cam-cylinder uncoupled from its driving shaft 126 as before described. The descent of the rock-shaft 136 under the action of the presser-foot lifting rock-lever to begin a new button attaching operation acts through the tappet-arm 157 and the trip-arm 162 to rock the bar 164, thereby thrusting the edge of the stripper-plate 190 into engagement with the pins 191 and 192 and thereby retracting the actuating and holding pawls and permitting the rack-bar 164 to return to initial position under the action of its spring 174.

Figure 2:
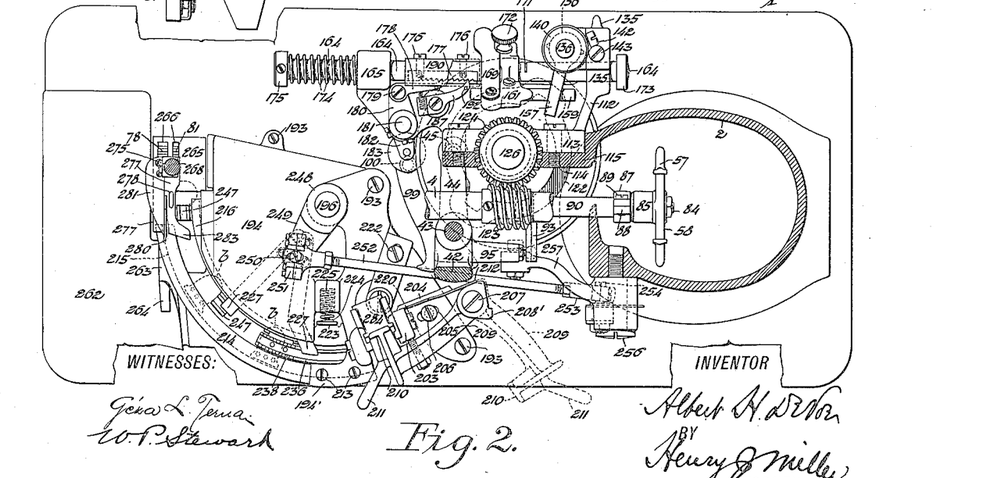

Secured upon the bed-plate between the bracket-arm standard 2 and the stitching point by means of screws 193 is the base-plate 194 of the button-presenting mechanism which is provided upon its upper face with the bearing boss 195 for the vertical feeder rock-shaft 196 and the lug 197 having a channeled inner face in which is secured by means of the screw 198 the flat bar 199 affording one of the side walls of the button magazine or hopper. The other side wall 200 of the hopper, which is formed upon its lower end with the button stop projection 201 is secured by means of the screw 202 upon the channeled side wall of a lug 203 formed upon the plate 204 secured adjustably upon the base-plate 194 by means of a screw 206 passing through an elongated aperture 205 therein. The plate 204 carries a fulcrum-stud 207 upon which is journaled the hub 208 of a swinging arm 209 formed with an upright bar 210 and with a finger 211 by means of which the lever or arm may be shifted. The bar 210 is slightly spaced from the adjacent edges of the bars 199 and 200, and serves as a retractable gate constituting the front end wall of the hopper. The boss 208 is formed with an angular head 208' against which rests the free arm of a flat spring 212 secured to the lug 203 and serving to maintain the lever 205 in either operative full line position or retracted dotted line position, represented in Fig. 2.

Secured to the bottom of a segmental tongue 194' of the base-plate by screws 213 is a segmental bar 214 disposed concentrically with the feeder rock-shaft 196 and provided in its inner edge with a deep groove or channel 215. The upper face of this bar is cut away flush with the lower wall of the channel at 214' at the extremity terminating beneath the upper gate 210, and is beveled at the other end where the upper side of the channel emerges at 214". Arranged adjacent to but spaced from the concave or channeled edge of the bar 214 is a substantially concentric bar 216 having in its convex edge the channel 217 and sustained by the fulcrum-screw 218 which is mounted within the bearing boss 219 having a foot-piece 220 secured upon the base-plate by the fastening screw 222 passing through the elongated aperture 221 therein. The upper face of the bar 216 is cut away at 216' opposite the hopper-gate 210 and flush with the lower wall of the channel 217. The bar 216 is formed with an upturned lip or flange 223 to sustain the thrust of one end of a spring 224 whose opposite end rests in the bottom of a socket 225 of the base-plate 194 by means of which the bar 216 is pressed outwardly normally against a suitable stop and with its free end slightly closer to the bar 214 than the opposite end, so as to insure a proper grasp of the opposite ends of the buttons $b$ introduced within the channels 215 and 217 which afford a raceway therefor.

Secured to the recessed under face of the base-plate 194 by screws 226 are the spring shanks 227 of the button-detents or detainers formed with the downturned lips or flanges 228 projecting between the bars 214 and 216 and having their lower edges beveled toward the end nearest the hopper but presenting abrupt button-engaging shoulders at the opposite ends. As the bars 214 and 216 are comparatively thin and are sustained only at their ends adjacent the hopper, their free or button delivery ends are adapted to yield more or less crosswise of the button raceway to accommodate themselves to the work in the operation of the mechanism.

The button-feeding member comprises a plate 229 fixed upon the lower end of the feeder rock-shaft 196 and provided with the radial arms 230, 231 and 232, each formed with a channel in its upper face. Fitted within the channel of the arm 230 is a tilting lever 233 fulcrumed upon the transverse pin 234 and having secured to its outer end by screws 235 the segmental feed-plate 236 formed in its upper face with the channel 237 and having upon the end adjacent the lever 233 a serrated button-engaging surface 238 disposed slightly below the level of the adjacent smooth surface. The head of the screw 239 tapped into the lever 233 serves to clamp the pivotal pin 234 against endwise displacement, and the lever 233 is normally maintained with its outer arm elevated by means of a flat spring 240 secured at one end upon the plate 229 by the screw 241 and having its other end resting in a notch 242 in the inner arm of such lever.

Fitted within the channels of each of the arms 231 and 232 of the plate 229 is a lever 243 pivotally mounted upon the cross-pin 244 secured in position by the set-screw 245. A spring 246 is interposed between the bottom of the channel and the end of a socket formed in the outer arm of each lever 243 which is recessed in the upper side to accommodate the raceway-bar 216 and provided at the outer end with the laterally spaced button-engaging lugs 247 beveled upon the upper edges toward the member 236 and disposed intermediate the bars 214 and 216.

Secured upon the upper end of the feeder rock-shaft 196 is the hub 248 of a crank-arm 249 carrying a ball-stud 250 which is embraced by a strap 251 of a pitman-rod 252 having at its opposite end the strap 253 similarly embracing the ball-stud 254 adjustably secured upon the slotted depending arm 255 of an elbow-lever mounted upon the fulcrum-stud 256 and having the lateral arm 257 carrying a roller-stud 258 entering the cam-groove 259 of the cam-cylinder 110 by means of which operative movements are imparted to the rock-shaft 196 which are communicated to the button-feeding elements 238 and 247. The cam-groove 259 is shaped to produce a plural-stage advance movement of the button feeder comprising a comparatively rapid delivery movement to position the buttons within the range of action of the stitch-forming mechanism followed by shorter interrupted movements to propel the button during the stitching operation correspondingly with the advance of the fabric under the action of the feed-dog 78 81, such plural-stage advance movement being followed by a single stage retrograde or return movement.

Figure 6:
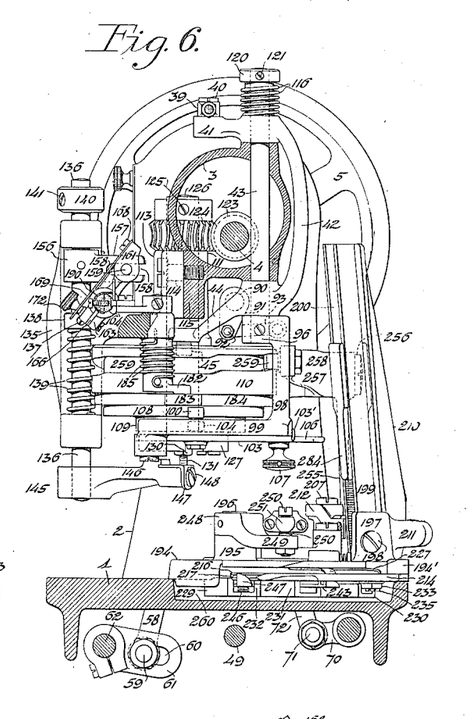
Figures 15, 16, 17, 18:
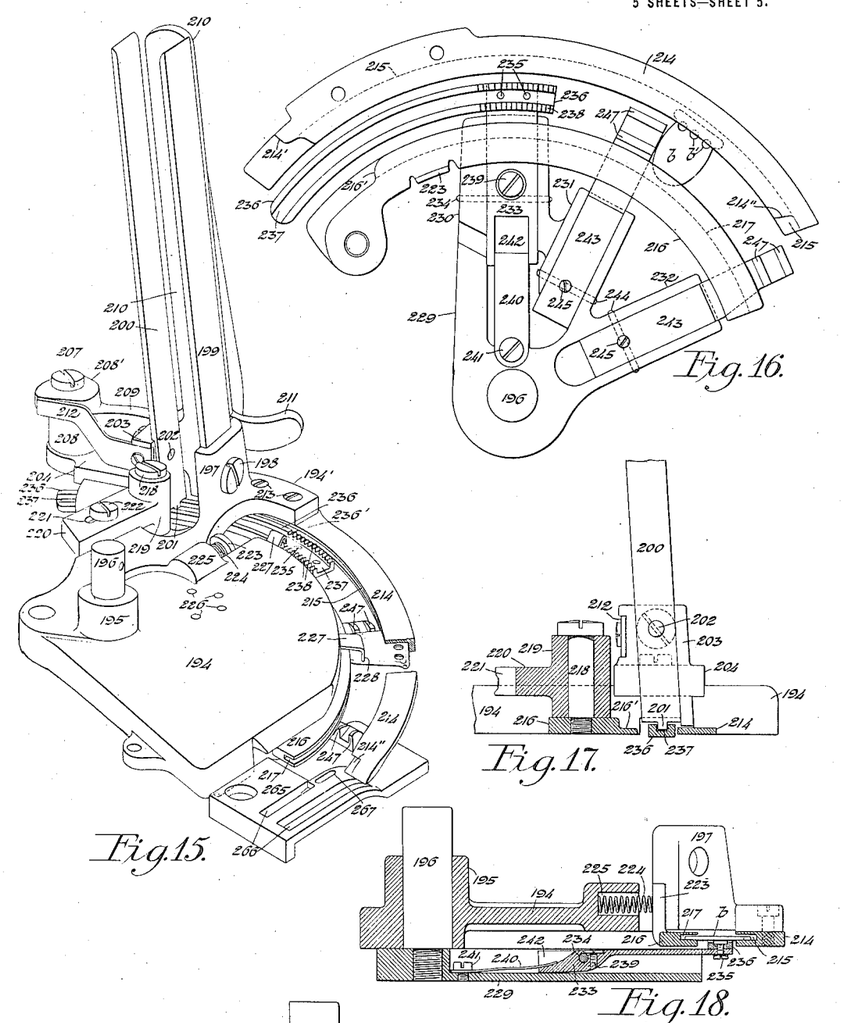
Figure 19:
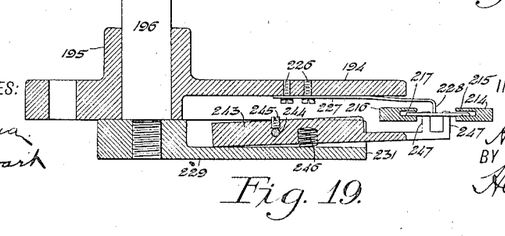

As indicated in Fig. 6, the bed-plate 1 is formed in its upper face with a recess 260 to accommodate the button-feeder plate 229 and parts sustained thereby, the button recess or bars 214 and 116 being arranged substantially flush with the top of the bed-plate so as to present the buttons in a plane only slightly above the same. The bed-plate is also recessed at 261 (Fig. 1) in advance of the line of feed to accommodate the work-sustaining plate 262 having at one edge the edge turning scroll 263 with central tongue 264 for turning over the margin of the body fabric presented to the stitch-forming mechanism. This scroll is arranged beneath the raceway-bar 214 whose forward extremity is cut away on the under side to accommodate it, as is also the part of the throat-plate 265 extending beneath it. The top of the throat-plate is disposed substantially at the level of the lower wall of the button raceway and is provided with the usual feed-dog apertures 266 and the elongated needle-hole 267 (Fig. 15).

Journaled in the head of the bracket-arm is the usual presser-bar 268 surrounded by the spring 269 interposed between the bushing 270 and the fixed collar 271 having the lateral lug 272 pivotally connected with the link 273 formed at its upper end with the slot 274 embracing the pin 150' of the lifting rock-lever 150. Secured to the reduced lower end of the presser-bar by the fastening screw 275 is the shank 276 of the presser-foot 277 whose lower or operative face has that side containing the needle-aperture 278 upwardly offset to produce a guiding shoulder 279. The presser-foot is provided in its forward portion with a slit having one wall in substantial alinement with the shoulder 279 and which is entered by the guide-flange 280 sustained by the spring-plate 281 which is secured upon the foot-plate by screws 282. The forward portions of both sections of the foot-plate are upturned, and that containing the needle-hole is formed with a laterally and forwardly projecting fabric smoothing wing 283 whose inclination toward the guide-flange 280 tends to direct the margin of the superposed lining fabric toward said flange.

In the use of the machine, the hopper-gate 210 is retracted and a series of fasteners or buttons introduced between the side walls 199 and 200 with the contracted portions in advance and the enlarged ends in contact with the front edges of the bars 199 and 200, after which they are pressed downwardly by the weight of a heavy block 284 fitted within the upper portion of the hopper and having its opposite sides channeled to loosely embrace the hopper members 199 and 200, the lower end of this block being oppositely beveled to permit the easy insertion of additional buttons between the same and the topmost button within the hopper. The gate 210 is then closed, thus confining the buttons within the hopper, with the lowermost button resting upon the feeder member 236. The rock-lever 150 is now tilted to raise the presser-foot, depress the rock-shaft 136 and turn the rock-shaft 164, thereby permitting the latch-arm 146 to move beneath the plunger-pin 131 under the torsional action of the spring 139 and causing the stripper-plate 190 to retract the actuating and holding pawls 178 and 187 to enable the rack-bar to assume its forward retracted position under the action of the spring 174, thereby disengaging the trip-arm 162 from the tappet-arm 157. While the presser-foot remains elevated, the body fabric *a* is passed over the work-sustaining plate and its margin inserted in the edge-folder 263 and the upper or lining fabric *c* is passed over the feeder base-plate 194 and its margin introduced beneath the apertured section of the presser-foot and in contact with the guide-rib 280. Upon the release of the rock-lever 150, the presser-foot descends upon the work and the rock-shaft 136 rises under the action of its spring 139, thereby lifting the coupling pin 131 to couple the cam-cylinder 110 to its continuously moving actuating shaft 126. In the starting position, the button-feeding elements are between their extreme positions, each being in engagement with one of the buttons, the primary feeding member presenting a shoulder 236' to the edge of the button last propelled from beneath the hopper. On setting the machine in motion, a few initial straightaway stitches *s* are formed while the advance button is moving into register with the stitch-forming mechanism, the button-feeder pausing in its advance, when the first hole comes into register with the needle. The movements of the feed-dog are then suspended while the needle performs its jogging movements to produce the first group of tacking stitches $t$ across the edge of the button. The feeder then continues its advance by a step-by-step movement to present to the needle the two succeeding holes $b'$ of the button beyond the needle-path, the operative movements of the feed-dog being simultaneously resumed, thereby producing the two straight-away fastening stitches $s'$ and the first of the succeeding group of tacking stitches, when the operative movements of both the button-feeder and feed-dog are suspended for the second period of needle-jogging movements to form the remaining tacking stitches over the edge of the button. At the completion of the second tack $t$, the action of the feed-dog in the production of a succeeding series of spacing stitches between the button positions is resumed and the button-feeder makes a continuous retrograde movement to extreme retracted position wherein each button-feeding element engages the next button, the foremost of the buttons within the raceway being propelled into register with the needle at the completion of said series of spacing stitches. As will be observed, the length of traverse of the feeding members is much less than the distance between the hopper and the stitch-forming mechanism, for which reason the detainers 228 are provided. In the advance of the buttons under the action of the feeder, each of the two foremost passes beneath a detainer 228 which is thrust upwardly to permit such movement, but in the retraction of the feeder, the abrupt shoulders presented by such detainers positively engage the buttons and prevent their return in the retrograde movement of the feeder, each button being thus detained until propelled forward by the feeding element next in advance of that from which it received its previous advance movement. As previously explained, the smooth upper surface of the feeding element 236 serves as a rest for the lowermost button in the travel of the serrated portion 238 to advance the button engaged thereby, and in the retrograde movement of such feeding element, the lowermost button is restrained against movement by the depending tongue 201 of the hopper member 200, such tongue projecting within the groove 237 of the feeding member.

The high portion 109' of the cam-track 109 is that which, acting upon the roller-stud 104, shifts the rocking feed-regulator frame for production of the spacing-stitch work-feeding movements, the length of such feeding movements being determined by the position of adjustment of the auxiliary lever 103 upon the arm 99, and hence the distance of the roller-stud 104 from the low portion, or that of least curvature, of the cam-track. The cam-track 108 is shown provided with a high portion 108' coöperating with the roller-stud 100 in spacing the fastening straight-away stitches $s'$, while a second high point 108" is arranged to slightly supplement the action of a cam portion 109' so as to insure the arrest of the work-feeding mechanism at precisely the proper time, regardless of the position of the roller-stud 104 which may in practice slightly disturb the timing of the suspension of feed. As represented in the drawings, the frame member 98 is provided with a segmental scale 98' and the lever 103 with a pointer 103' for convenience in setting the feed-regulator for the desired length of the spacing stitches $s$.

Figure 20:
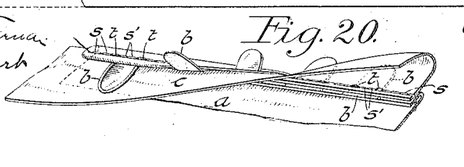
Fig. 20 is a perspective view of a tabi-flap provided with fasteners or buttons secured thereto by means of the present improvement.

The relation of the overlapped margins of the two plies $a$ and $c$ of fabric is represented at the right in Fig. 20, wherein the lining fabric is turned over at the left-hand end to overlie the body fabric, this position being that resumed when the fabric is embodied in a tabi. By reference to Figs. 2, 3 and 15, it will be observed that, while the button raceway-bar 214 terminates in advance of the operative portion of the presser-foot, the corresponding portion of the raceway-bar 216 descends to a point beyond the needle-aperture 278 so that, under the action of its spring 224, it is caused to press the straight and apertured end portion of the button firmly in contact with the guiding shoulder 279 of the presser-foot so as to insure the proper presentation of the button to the stitch-forming mechanism in its travel across the range thereof. By the provision of a yielding member 81 of the feed-dog beneath the apertured side of the presser-foot the primary feed-dog section 77 is caused to firmly grip the fabric in the advance of the same to space the stitches, while an effective pressure is maintained upon the portion of fabric beneath the presser-foot which is thickened by interposition at intervals of the buttons or fasteners.

As will be readily understood, the automatic uncoupling of the controlling cam-cylinder 110 from its driving means at the completion of a series of button attaching and spacing cycles sets the mechanism for plain stitching with a uniform feed, thus permitting not only the finishing of the heel seam but the stitching of other parts of the article without the action of the button-presenting mechanism.

The mechanism as thus described is particularly adapted for application of metallic fasteners or buttons to the heel flaps of tabis, but it is evident that many of its constructive features are well adapted for use in other classes of work, and that the various constructive features may accordingly be modified in construction and arrangement, and may in some instances be disassociated from certain others, without departure from the scope of the present invention.

Having thus set forth the nature of the invention, what I claim herein is:—

1. In a sewing machine, the combination with stitch-forming and feeding mechanisms, of automatically acting means adapted to control the same for production of groups of tacking stitches each disposed in the direction of feed and spaced at different intervals from the preceding and succeeding groups of tacking stitches and connected therewith by straight-away stitches.

2. In a sewing machine, the combination with stitch-forming and feeding mechanisms, of automatically acting means adapted to control the same for production of groups of tacking stitches each spaced at different intervals from the preceding and succeeding groups of tacking stitches and connected therewith by straight-away stitches, and means for varying the relative lengths of the intervals between said groups of tacking stitches.

3. In a sewing machine, in combination, stitch-forming mechanism including a reciprocating needle, feeding mechanism, means for imparting to said needle interrupted series of lateral jogging movements, and means connected with the feeding mechanism for producing at intervals feeding movements in groups or successions of different length alternately during the periods of interruption of the needle jogging movements.

4. In a sewing machine, in combination, stitch-forming mechanism including a reciprocating needle, feeding mechanism, means for imparting to said needle interrupted series of lateral jogging movements within the direction of feed, and means connected with the feeding mechanism for producing at intervals feeding movements in groups or successions of different length alternately during the periods of interruption of the needle jogging movements.

5. In a sewing machine, in combination, stitch-forming mechanism including a reciprocating needle, feeding mechanism, means for imparting to said needle interrupted series of lateral jogging movements, means connected with the feeding mechanism for producing at intervals feeding movements in groups or successions of different length alternately during the periods of interruption of the needle-jogging movements, and means for adjusting the relative lengths of the feeding movements of successive groups.

6. In a sewing machine, in combination, stitch-forming mechanism including a reciprocating needle, feeding mechanism, means for imparting to said needle interrupted series of lateral jogging movements, means connected with the feeding mechanism for producing at intervals feeding movements in groups or successions of different length alternately during the periods of interruption of the needle-jogging movements, and means for adjusting both the relative and actual lengths of the feeding movements of successive groups.

7. In a sewing machine, the combination with stitch-forming mechanism including a reciprocating needle, and feeding mechanism, of controlling means connected with the feeding mechanism for production alternately of groups of feeding movements of different length with intermediate periods of suspension of said movements, and means for producing lateral jogging movements of said needle during the periods of suspension of feeding movements.

8. In a sewing machine, in combination, stitch-forming mechanism including a reciprocating needle, intermittently acting feeding mechanism, means for imparting to said needle interrupted series of lateral jogging movements, means for controlling the feeding mechanism for production at intervals of feeding movements of groups or successions during the periods of interruption of the needle-jogging movements, and automatically acting means for establishing the continuous operation of the feeding mechanism following a needle-jogging period.

9. In a sewing machine, in combination, stitch-forming mechanism including a reciprocating needle, feeding mechanism, means for imparting to said needle interrupted series of lateral jogging movements, means for controlling the feeding mechanism for production at intervals of feeding movements in groups or successions during the periods of interruption of the needle-jogging movements, and automatically acting means for rendering said controlling means inactive.

10. In a sewing machine, the combination with stitch-forming mechanism, of button-presenting means comprising a race-way, a reciprocatory button feeding member normally movable in parallelism with said race-way with which it is adapted for relative transverse yielding movement, and a button-detainer affording an abrupt button-engaging shoulder to prevent retrograde movement of the buttons with the feeder.

11. In a sewing machine, the combination with stitch-forming mechanism, of button-presenting means comprising a race-way adapted to guide the buttons in a substantially fixed path, a reciprocatory button feeding member normally movable in parallelism with said race-way and adapted to yield transversely thereto; and a button-detainer for preventing the retrograde movement of the buttons with the feeder.

12. In a sewing machine, the combination with stitch-forming mechanism, of button-presenting means comprising a race-way adapted to guide the buttons in a substantially fixed path, a reciprocatory button-feeding member normally movable in parallelism with said race-way and adapted to yield transversely thereto, and a button-detainer for preventing the retrograde movement of the buttons with the feeder but adapted to yield oppositely to the feeder.

13. In a sewing machine, the combination with stitch-forming mechanism, of button-presenting means comprising a race-way, a reciprocatory button feeding member normally movable in parallelism with said race-way and having a plurality of button-engaging shoulders spaced apart a shorter distance than the length of traverse of said member, and a plurality of button-detainers coöperating with said feeder in preventing the retrograde movement of the buttons therewith.

14. In a sewing machine, the combination with stitch-forming mechanism, of button-presenting means comprising a raceway having a receiving end adapted for reception of buttons and a delivery end in register with the stitch-forming mechanism, a button-detainer disposed intermediate the ends of said raceway, a button-feeder having a plurality of button-engaging elements and adapted for movement along said raceway, and means for imparting to said button-feeder reciprocatory movements of less amplitude than the length of said raceway.

15. In a sewing machine, the combination with stitch-forming and work-feeding mechanisms, of button-presenting means comprising a raceway having a receiving end adapted for reception of buttons and a delivery end in register with the stitch-forming mechanism, a button-detainer disposed intermediate the ends of said raceway, a button-feeder having a plurality of button-engaging elements and adapted for movement along said raceway, and cam-actuated means for imparting to said button-feeder plural-stage operative movements including a single-step button-conveying movement followed by a plurality of shorter movements synchronous with those of the work-feeding mechanism during the production of button-fastening stitches.

16. In a sewing machine, the combination with stitch-forming and work-feeding mechanisms, of button-presenting means comprising a raceway, a button-feeding element for propelling the buttons through said raceway into register with the stitch-forming mechanism, and actuating means for imparting to said button-feeding element plural-stage movements to first carry the button into register with the stitch-forming mechanism and thereafter advance the button synchronously with the action of the work-feeding mechanism upon the work in spacing button-fastening stitches.

17. In a sewing machine, the combination with stitch-forming mechanism and a presser-foot formed upon its lower face with a longitudinally extending shoulder, of button-presenting means comprising a raceway formed of two spaced bars having button-guiding grooves in their adjacent edges and one of which is extended to a position adjacent the stitching point and opposite said shoulder of the presser-foot and is adapted to yield edgewise and relatively to the latter, and a button-feeding member for propelling the buttons through said raceway.

18. In a sewing machine, the combination with stitch-forming and feeding mechanisms, of button-presenting means comprising a raceway formed of two spaced bars having button-guiding grooves in their adjacent edges, a button-feeding member for propelling the buttons through said raceway to the stitch-forming mechanism, and an edge turner extending beneath one of said raceway-bars and directed within the range of action of the stitch-forming mechanism.

19. In a sewing machine, the combination with stitch-forming mechanism and a presser-foot formed upon its lower face with a longitudinally extending shoulder and provided above and in advance of the same with a laterally extending work-smoothing wing, of button-presenting means comprising a raceway formed of two spaced bars having button-guiding grooves in their adjacent edges and one of which is extended to a position adjacent the stitching point and opposite said shoulder of the presser-foot and is adapted to yield edgewise and relatively to the latter, a button-feeding member for propelling the buttons through said raceway, and an edge-turner extending beneath the second of said raceway-bars and directed within the range of action of the stitch-forming mechanism.

20. In a sewing machine, the combination with stitch-forming mechanism, a presser-foot, and button-presenting means comprising a raceway directed toward the stitch-forming mechanism and button-propelling means, of feeding mechanism comprising a primary feed-dog section opposed to the presser-foot at one side of said raceway relative to the direction of feed and an auxiliary feed-dog section yieldingly mounted relatively to the primary section and opposed to the presser-foot in alinement with said raceway.

21. In a sewing machine, the combination with stitch-forming mechanism, of a button-raceway, a button-hopper connected therewith, a reciprocatory button-feeder arranged within said raceway and extending beneath and serving as a bottom for the hopper and as a support for each button in its travel from the hopper to the stitch-forming mechanism and having an operative face of greater length than its length of traverse, and actuating means for said button-feeder.

22. In a sewing machine, the combination with a stitch-forming mechanism, of a button-raceway, a button-hopper connected therewith and having a depending stop-lug extending into alinement with the raceway, a reciprocatory button-feeder arranged within said raceway and extending beneath and serving as a bottom for the hopper, said feeder having an operative face of a length exceeding that of its operative movement and formed with a longitudinal channel to admit said stop-lug, and actuating means for said button-feeder.

23. In a sewing machine, the combination with stitch-forming mechanism, of a button-raceway, a button-hopper connected therewith and open upon one side and a retractable gate applied to said open side, a reciprocatory button-feeder arranged within said raceway and affording a movable bottom for the hopper and adjacent portions of the raceway, and actuating means for said feeder.

24. In a sewing machine, the combination with stitch-forming mechanism, of a button-raceway, a button-hopper connected therewith and open upon one side and a spring-pressed swinging gate applied to said open side, a reciprocatory button-feeder arranged within said raceway and affording a movable bottom for the hopper and adjacent portions of the raceway, and actuating means for said feeder.

25. In a sewing machine, the combination with stitch-forming mechanism, of a button-presenting means comprising a raceway formed of two spaced bars having button-guiding grooves in their adjacent edges, one of said bars being rigidly secured to a fixed support and the other pivotally mounted thereon and spring-pressed toward the first-named bar, and a button-feeding member for propelling the buttons through said raceway.

26. In a sewing machine, the combination with stitch-forming and feeding mechanisms, of automatically acting means adapted to control the same for the production of groups of tacking stitches each spaced at different intervals from the preceding and succeeding groups of tacking stitches and connected therewith by straightaway stitches, the tacking stitches being parallel with the straightaway stitches.

27. In a sewing machine, in combination, stitch-forming mechanism including a reciprocating needle, feeding mechanism, means connected with the feeding mechanism for producing at intervals feeding movements in groups or successions of different length, and means for imparting to said needle series of lateral jogging movements parallel to the line of feed and alternately with the said feeding movements.

In testimony whereof, I have signed my name to this specification, in the presence of two subscribing witnesses.

ALBERT H. DE VOE.

Witnesses:
HENRY A. KORNEMANN, Jr.,
GÉZA L. FERNA.